United States Patent

[11] 3,622,293

| [72] | Inventor | Miles S. Firnhaber |
| | | 2648 Glen Cove Parkway, Pewaukee, Wis. 53072 |
| [21] | Appl. No. | 782,635 |
| [22] | Filed | Dec. 10, 1968 |
| [45] | Patented | Nov. 23, 1971 |

[54] APPARATUS FOR MANUFACTURING GLASS FIBERS
1 Claim, 5 Drawing Figs.

| [52] | U.S. Cl. | 65/14, 65/6 |
| [51] | Int. Cl. | C03b 37/04 |
| [50] | Field of Search | 65/6, 8, 14, 15, 12 |

[56] References Cited
UNITED STATES PATENTS

| 2,949,631 | 8/1960 | Kleist et al. | 65/14 |
| 3,393,986 | 7/1968 | Firnhaber | 65/15 |

*Primary Examiner*—S. Leon Bashore
*Assistant Examiner*—Robert L. Lindsay, Jr.
*Attorney*—Morsell & Morsell ABSTRACT: There is a cup-shaped rotor to receive molten glass and there is a lining for the rim portion and bottom of the rotor, the rim portion of the lining being apertured and spaced from an apertured rim portion of the rotor, there being an annular partition subdividing the annular space into an outer annular hot gas chamber and an inner annular molten glass-receiving chamber, said hot gas chamber having openings to receive hot gases from a burner during rotation of the rotor, and said lining being formed principally of lapped sector-shaped segments.

PATENTED NOV 23 1971 3,622,293
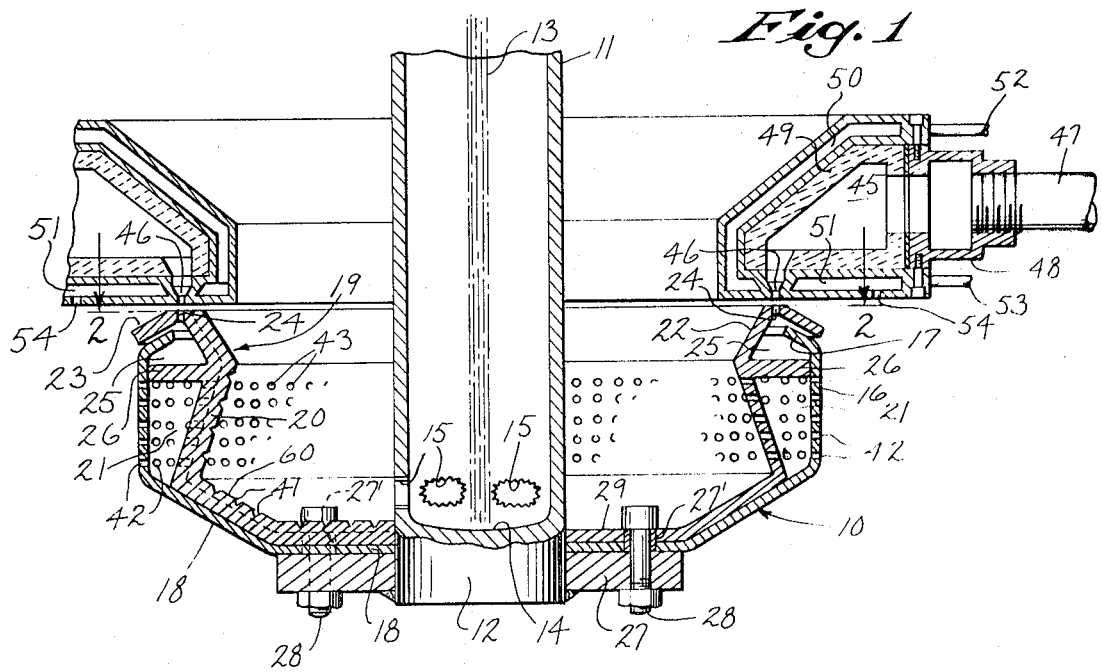
Fig. 1
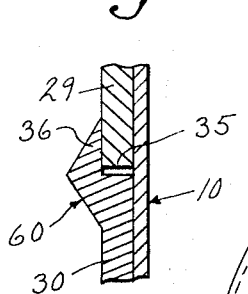
Fig. 4
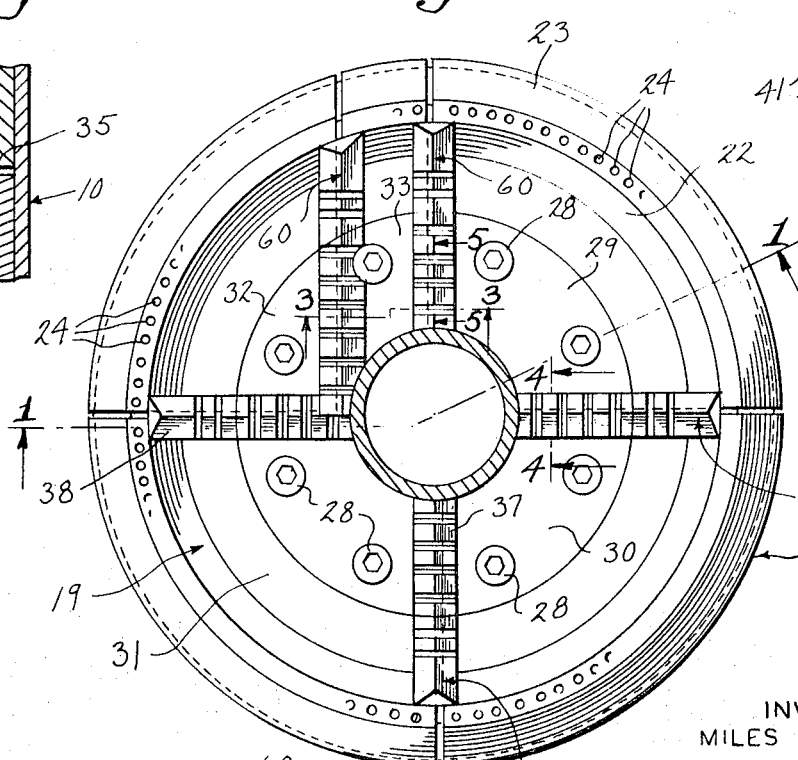
Fig. 2
Fig. 5
Fig. 3
INVENTOR
MILES S. FIRNHABER
BY
Morsell & Morsell
ATTORNEYS

APPARATUS FOR MANUFACTURING GLASS FIBERS

BACKGROUND OF THE INVENTION

1. Field of the Invention

The present invention relates to apparatus for manufacturing glass fibers which are used for insulation and other related purposes.

2. Description of the Prior Art

When molten glass is centrifuged directly through a multiplicity of holes in the rim of a rotor the holes must have a certain minimum diameter to enable the molten glass to pass through. Such passage, however, is necessarily retarded and a pool of molten glass tends to form adjacent the lower portion of the periphery of the rotor. This may cause premature cooling, with the result that the discharged material may be in the form of thin rods which are prematurely cool. When this occurs many of the thin rods fail to fiberize when subjected to the fiberizing blast, and there will be an undesirable percentage of slugs or coarse fibers. In addition to the above, if a pool of molten glass tends to build up in the rotor it will usually unbalance the latter, with undesirable results.

In my prior U.S. Pat. No. 3,393,986, dated July 23, 1968, there is disclosed a rotor having inner and outer rims, each with a multiplicity of small apertures, with an annular chamber between the inner and outer rims. The inner rim of the prior patent does not form a full lining for the rotor and there is no way of introducing hot gases into the annular chamber between the inner and outer rims in a manner to insure that the apertured rims of the rotor and liner are kept at the temperature of the molten glass.

SUMMARY OF THE INVENTION

The present invention provides a lining for the bottom and rim of the rotor, with the rim portion of the liner spaced from the rim of the rotor. In addition, the rim of the liner has openings which preliminarily break up the stream of molten glass, the glass passing into an annular chamber before being discharged through the apertures in the rim of the rotor to be fiberized by a fiberizing blast. The annular space between the rim of the liner and the rim of the rotor is divided by an annular partition into an outer annular chamber and an inner annular chamber, and there are means for introducing hot gases from the burner directly into said outer annular chamber for the purpose of maintaining the rim portion at approximately the temperature of the molten glass to prevent the glass from becoming devitrified by contact with cooler metal.

It is a general object of the present invention to provide improved apparatus for manufacturing glass fibers wherein a novel construction is employed in the rotor for preliminarily breaking up the stream of molten glass before it is discharged and for maintaining said stream at a relatively high temperature.

A further object of the invention is to provide an improved apparatus for manufacturing glass fibers wherein more molten glass is centrifuged by the rotor in a given period of time and wherein there is a finer product with less slugs and coarse fibers.

A further object of the invention is to provide improved apparatus of the class described wherein the discharge for hot gases from the burner is so located that some of these hot gases pass into specially arranged openings in the rotor leading to an outer annular heat-receiving chamber, which chamber is adjacent the annular glass-receiving chamber to maintain the molten glass therein at a high temperature.

With the above and other objects in view, the invention consists of the improved apparatus for manufacturing glass fibers, and all of its parts and combinations, as set forth in the claims, and all equivalents thereof.

BRIEF DESCRIPTION OF THE DRAWING

In the accompanying drawing, illustrating one complete embodiment of the preferred form of the invention, in which the same reference numerals designate the same parts in all of the views:

FIG. 1 is a transverse sectional view through a rotor and burner, taken on the line 1–1 of FIG. 2, parts being broken away;

FIG. 2 is a view taken approximately on the line 2–2 of FIG. 1;

FIG. 3 is an enlarged sectional view taken on the line 3–3 of FIG. 2;

FIG. 4 is an enlarged sectional view taken on the line 4–4 of FIG. 2; and

FIG. 5 is an enlarged sectional view taken on the line 5–5 of FIG. 2.

DESCRIPTION OF THE PREFERRED EMBODIMENTS

Referring more particularly to the drawing, the apparatus includes a cup-shaped rotor 10 of suitable heat-resistant material, such as a chrome-nickel alloy, mounted on the lower end of a drive shaft 11. Where the drive shaft is disposed vertically as in FIG. 1 it is preferred to make it tubular as shown and to have a closed lower end 12. With this arrangement a stream of molten glass 13 from a forehearth will fall onto the concavity 14 of the closed bottom and be directed by centrifugal force out of openings 15 into the rotor, the openings preferably having a serrated margin as shown so as to break up the molten glass into small individual streams.

While the drawing and above description discloses the rotor as disposed in a horizontal plane it might be mounted at an oblique angle as shown in my prior U.S. Pat. No. 3,393,986, in which case the drive shaft 11 is solid and the stream of glass is directed into the lower portion of the rim of the rotor.

The shaft 11 is rotatably driven by any suitable means and is suitably supported to drive the rotor 10 at high speed. The rotor has an outer rim 16 provided with an inturned, angularly extending annular flange 17. The rotor also has a dished bottom portion 18 with a relatively large central opening through which the lower end of the drive shaft extends.

The liner 19 for the rotor is also preferably made of a suitable heat-resistant material such as a chrome-nickel alloy. The liner has a bottom portion shaped to fit the dished bottom portion of the rotor, and the liner has a frustoconical rim portion 20 spaced from the rim portion 16 of the rotor to provide an annular molten glass-receiving space 21 of increasing cross section upwardly. An annular flared portion 22 extends upwardly and outwardly from the upper end of the rim portion 20, and there is an annular flange 23 projecting outwardly and downwardly from the upper edge of the flared rim portion 22. Located approximately at the junction between the annular portions 22 and 23 is an annular series of holes 24 which are located within the margin of the angled rim portion 17 of the rotor so that gases passing through said holes 24 will enter an annular hot gas chamber 25, which is separated from the annular molten glass chamber 21 by an annular partition 26, which partition projects laterally from the lining.

The lining is formed of multiple segments as will be hereinafter described, and these segments are detachably secured to the rotor and to a base plate 27 by bolts 28 which extend through nickel bushings 27', said bushings taking up any heat stresses and preventing buckling of the metal of the liner which is outwardly of the bushings. As a feature of this invention the lining is formed of segments which are fitted together in a way to permit assembly of the lining in the rotor, as well as to permit removal thereof when it is necessary to replace the liner. In the preferred embodiment illustrated there are four sectors or pie-shaped sections 29, 30, 31 32, and there is an elongated keying section 33. The inner portion of each section fits snugly around the outer periphery of the drive shaft 11, as shown in FIGS. 1 and 2.

Referring first to FIG. 3, the liner section 29 has one radial edge 34 which is plain. Its other radial edge 35 is also plain, as shown in FIG. 4, and is overlapped by a lapping flange 36 projecting from the segment 30. The other radial edge of the segment 30 is plain is overlapped by a lapping flange 37 projecting from one radial edge of the segment 31. The other radial edge of the segment 31 is plain and is overlapped by a lapping flange 38 projecting from one radial edge of the segment 32. As shown in FIG. 3, the keying section 33 has lapping flanges 39 and 40 on both edges to overlap the adjacent edges of the sections 32 and 29.

The lapping flanges are formed by laterally projecting portions of radial ribs 60 which are triangular in cross section, as shown in FIGS. 3 and 4. Each of these triangular ribs 60 is transversely grooved by longitudinally spaced grooves 41, as shown in FIG. 3, each groove being V-shaped in cross section, as shown in FIG. 5. With this segmental arrangement for the lining, when the bolts 28 are removed, then by first removing the keying section 33, all of the other sections 29–32 can be easily withdrawn.

The rim portion of the rotor has a number of rows (greater than the number shown) of holes 42, and the rim portion of the liner has about six rows of holes 43. The holes in the liner may be about 3/16 inch in diameter, and there will be in the neighborhood of 300 holes in a circular row. There will be a greater number of rows of the holes 42 in the rotor because they are much smaller, only about 0.025 inch in diameter. The total area of the holes in the liner should be no greater than the total area of the holes in the rotor so as to prevent any accumulation of glass in the chamber 21. Preferably the total area of the holes in the liner will be less.

A suitable supported burner 44 is arranged as illustrated to discharge a high-velocity blast of hot gases from the annular burner chamber 45 through a circular slot 46, the slot being positioned so that some of these hot gases pass into the holes 24 at the top of the liner and into the annular hot gas chamber 25. Thus this chamber is kept very hot. Because of its proximity to the annular chamber 21 the temperature of the perforated portion of the rotor and liner are kept at practically the temperature of the molten glass to prevent devitrifying of the glass, which condition might occur if the glass were to contact cooler metal. With the present invention all of the metal adjacent the perforated portions is kept sufficiently hot to minimize problems.

The burner has one or more inlet pipes 47 which supply gases to a manifold 48. The annular burner chamber 45 is surrounded by refractory material 49 which is cooled by a cooling jacket 50 having a steam space 51 into and out of which steam may be circulated by the pipes 52 and 53. The stem is superheated by the burner, and at the same time tends to act as a cooling agent around the refractory material 49. In addition, this superheated steam is discharged from a circular slot 54 or from a circular series of small openings which are so arranged around the rotor as to rapidly convey away the fiberized material.

In use of the apparatus, the molten glass from the stream 13 falls on the dished bottom 14 of the cylindrical pipe 11, and this glass is then thrown out of the holes 15 by centrifugal force, the serrated margins of the holes 15 serving to preliminarily break up the glass into smaller streams. Due to the action of centrifugal force, the molten glass is rapidly distributed around the periphery of the the rim of the liner and caused to pass through the holes 43 of the liner.

During rotation of the rotor the triangular ribs 60, which are transversely grooved, as at 41, serve to agitate the glass to prepare it for more readily passing through the holes of the liner. Due to the larger size of the liner holes 43 as compared with the rotor holes 42, the molten material is rapidly transferred to the annular glass-receiving chamber 21 in a preliminarily broken-up condition to enable it to more readily be centrifuged through the smaller holes 42 in the rim of the rotor proper. Due to this fast action, the tendency to collect a pool of molten glass in the rotor is minimized with the result that the molten glass is not prematurely cooled in the rotor. In addition, due to the fact that part of the hot gases from the annular burner slot 46 pass through the holes 24 into the outer rotor chamber 25, all of the adjacent portions of the rotor and liner are kept at a high temperature, substantially that of the molten glass, to prevent the molten glass from being devitrified by contact with cooler metal.

By utilizing the cooling steam from the jacket space 51 for the dual purpose of cooling and conveying, an efficient conveying medium is provided which is capable of rapidly moving the fibers away from the rotor, thereby providing an increase in production.

What I claim is:

1. In an apparatus for manufacturing glass fibers having a rotatably supported cup-shaped rotor for molten glass, having a bottom, and having a surrounding outer rim with a multiplicity of small apertures, the improvement comprising: a lining having a bottom portion fitting the bottom of the rotor and having an apertured rim portion spaced inwardly from the rim of the rotor in a position to provide an annular chamber between said liner rim and rotor rim, an annular partition dividing said annular chamber into an outer hot gas chamber and an inner molten glass chamber and said hot gas chamber being free of communication with other rotor chambers, there being a circle of gas receiving openings communicating with said hot gas chamber, and there being an annular outlet from the hot gas chamber positioned to direct hot gases outwardly of the rotor, and means for directing hot gases into said hot gas openings as the rotor rotates.

* * * * *